United States Patent
Kwan (10) Patent No.: US 7,742,996 B1
(45) Date of Patent: Jun. 22, 2010

(54) COMPUTER PROGRAM, SYSTEM AND METHOD FOR ON-LINE ISSUING AND VERIFYING A REPRESENTATION OF ECONOMIC VALUE INTERCHANGEABLE FOR MONEY HAVING IDENTIFICATION DATA AND PASSWORD PROTECTION OVER A COMPUTER NETWORK

(76) Inventor: Khai Hee Kwan, P.O. Box 1178, Sandakan, Sabah (MY) 90713

( * ) Notice: Subject to any disclaimer, the term of this patent is extended or adjusted under 35 U.S.C. 154(b) by 1668 days.

(21) Appl. No.: 10/214,351

(22) Filed: Jul. 28, 2002

Related U.S. Application Data (63) Continuation-in-part of application No. 09/945,586, filed on Sep. 4, 2001.

(60) Provisional application No. 60/235,578, filed on Sep. 27, 2000.

(51) Int. Cl.
- G06F 17/00 (2006.01)
- G06Q 20/00 (2006.01)
- F06Q 20/00 (2006.01)

(52) U.S. Cl. .................. 705/72; 235/375; 235/474

(58) Field of Classification Search .............. 705/45, 705/50, 35, 17, 55, 72; 707/205; 708/106; 235/380
See application file for complete search history.

(56) References Cited

U.S. PATENT DOCUMENTS

| | | | | |
|---|---|---|---|---|
| 3,920,979 A * | 11/1975 | Kilby et al. ............... 708/106 |
| 5,206,905 A * | 4/1993 | Lee et al. .................. 705/55 |
| 5,265,008 A * | 11/1993 | Benton et al. ............. 705/44 |
| 5,267,299 A * | 11/1993 | Nomura ................ 379/88.02 |
| 5,341,428 A * | 8/1994 | Schatz ..................... 713/185 |
| 5,594,226 A * | 1/1997 | Steger ..................... 235/379 |
| 5,644,727 A * | 7/1997 | Atkins ...................... 705/40 |
| 5,657,389 A * | 8/1997 | Houvener ................. 713/186 |
| 5,677,955 A * | 10/1997 | Doggett et al. ............ 705/76 |
| 5,731,575 A * | 3/1998 | Zingher et al. ............ 235/379 |
| 5,832,464 A * | 11/1998 | Houvener et al. ......... 705/45 |
| 5,875,437 A * | 2/1999 | Atkins ...................... 705/40 |
| 5,909,673 A * | 6/1999 | Gregory .................. 705/45 |
| 5,925,865 A * | 7/1999 | Steger ..................... 235/379 |
| 5,961,644 A * | 10/1999 | Kurtzberg et al. .......... 726/23 |
| 6,073,121 A * | 6/2000 | Ramzy ..................... 705/45 |
| 6,144,848 A * | 11/2000 | Walsh et al. ............. 455/419 |
| 6,148,342 A * | 11/2000 | Ho ......................... 709/225 |
| 6,233,565 B1 * | 5/2001 | Lewis et al. ............... 705/35 |
| 6,289,323 B1 * | 9/2001 | Gordon et al. ............. 705/40 |
| 6,390,362 B1 * | 5/2002 | Martin .................... 235/379 |
| 6,439,454 B1 * | 8/2002 | Masson et al. ............ 235/375 |
| 6,454,174 B1 * | 9/2002 | Sansone .................. 235/494 |
| 6,505,179 B1 * | 1/2003 | Kara ....................... 705/50 |
| 6,636,833 B1 * | 10/2003 | Flitcroft et al. ............. 705/1 |

(Continued)

Primary Examiner—Evens J Augustin (57) ABSTRACT

An electronic economic value representation distribution system. The potential user may specify the economic value representation. A password is required to lock in the representation and is stored in the issuer server. Information identifying the representation is linked to the password stored in the database. User can create the said representation by downloading from the issuer computer that may be printed on the user's printer connected to his personal computer. On presentation of the said economic value representation at verifier's terminal connected to issuer server, identifying data is transmitted to issuer server for verification. Upon successfully verifying said identifying information, user is requested to present the password locking the representation. Upon successful authentication of presented and successful reconciling with originating account, verifier is to provide user with services or amount valued by the economic representation.

19 Claims, 6 Drawing Sheets

U.S. PATENT DOCUMENTS

| | | | |
|---|---|---|---|
| 6,647,400 B1 * | 11/2003 | Moran | 707/205 |
| 6,735,575 B1 * | 5/2004 | Kara | 705/50 |
| 6,764,001 B1 * | 7/2004 | Kawai et al. | 235/380 |
| 6,766,301 B1 * | 7/2004 | Daniel et al. | 705/14 |
| 6,771,597 B2 * | 8/2004 | Makansi et al. | 370/230 |
| 6,795,827 B1 * | 9/2004 | Ohira | 707/101 |
| 6,938,019 B1 * | 8/2005 | Uzo | 705/65 |
| 6,948,077 B1 * | 9/2005 | Pitale | 726/9 |
| 7,051,206 B1 * | 5/2006 | Giest et al. | 713/176 |
| 2002/0073028 A1 * | 6/2002 | Kasai et al. | 705/41 |
| 2002/0099652 A1 * | 7/2002 | Herzen et al. | 705/39 |
| 2004/0204986 A1 * | 10/2004 | Shimbori et al. | 705/14 |

* cited by examiner

| | |
|---|---|
| 210 | Welcome User XXX Your last login was 10 Jan 2002 at 10 00 PM Please complete this page. |

| | |
|---|---|
| Outstanding | 3 Issued Notes Total Value 24.00 |
| Amount For this Note | |
| Security Indicia | ☐ Photo ☐ Barcode ☐ Image |
| Account to withdraw | Click to select |
| Expiry Date | |
| Password | Tel. |
| Email if different from record | |

Bal as at 14 Jan 2002, click on the accounts for details.
Savings Account Balance : $1000
Credit Card Balance $800
Fixed Deposit : $9000 Expiring 12 June 2002
Advantage Saver : $300
Gold Account 30 oz Back    Withdraw now 220    250    260    240

COMPUTER PROGRAM, SYSTEM AND METHOD FOR ON-LINE ISSUING AND VERIFYING A REPRESENTATION OF ECONOMIC VALUE INTERCHANGEABLE FOR MONEY HAVING IDENTIFICATION DATA AND PASSWORD PROTECTION OVER A COMPUTER NETWORK

CROSS-REFERENCE TO RELATED APPLICATIONS

This application is a continuation-in-part of U.S. patent application Ser. No. 09/945,586 filed Sep. 4, 2001 which itself claims benefits from U.S. provisional application Ser. No. 60/235,578 filed Sep. 27, 2000, incorporated herein by reference.

STATEMENT REGARDING FEDERAL SPONSORED RESEARCH OR DEVELOPMENT

Not Applicable

REFERENCE TO A MICROFICHE APPENDIX

Not Applicable

BACKGROUND OF THE INVENTION

1. Technical Field

The present invention relates generally to an improved system and method for incorporating a password on a bearer financial instrument and proving ownership by requiring the legal user to authenticate using said first password over the network on presentation of the instrument. The bearer instrument is a representation of the owner's authority or rights and may include a machine to readable code representing an unique identifier or image capable of being read by a machine to obtain first verification of legitimacy of the document and presentation of said password to authenticate ownership. The system includes verifying module to verify the bearer instrument and authenticating of its ownership.

2. Description of the Prior Art

In U.S. Pat. No. 5,598,477, issued to Berson, a customer submits information concerning a desired ticket (e.g., scheduling data pertaining to an airline flight). A data processing system sends ticketing information and encrypted validation data to a local printing system. The local system prints the ticket, which includes the validating information encoded in a two-dimensional barcode. The customer presents the ticket at flight time, where a validating system scans the barcode, transforms the data from physical form into digital form and validates it. If valid, the customer receives his boarding pass, luggage claim checks, etc.

The use of two-dimensional barcodes requires printers capable of producing, and barcode scanners capable of reading, such barcodes. Depending upon the number of sites at which tickets are printed or accepted, this may involve significant cost as the local validating device requires special decryption software. Second, the use of cryptographic means to secure the validation information requires a sophisticated key management scheme. This prior art concentrates on the validating the ticket itself rather than the holder of the ticket which is expressed in this application. Verification is done entirely remotely at the issuer server as compare to prior art, which is locally.

In U.S. Pat. No. 6,216,227, issued to Goldstein, et al, although not directly related, teaches the use of large random numbers may be used in place of cryptographic security and uses a one dimension barcode as an alternative.

According to Goldstein who teaches away, "this scheme still possesses the disadvantages inherent in paper tickets, such as destruction or mutilation and the limitation to a single use. In addition, without further protection, the database of random numbers provides a single point of vulnerability. A person with access to the database could conceivably generate large quantities of bogus tickets."

In most prior arts the focus has been to ensure that the physical representation such as a ticket or smart card is legitimate and attached certain identifiable characteristics to be matched or reconciled on verification. This includes the new generation of smart cards where they stored biometrics of the holder and on presentation these biometrics are retrieved and check against the card holder. In U.S. Pat. No. 6,216,227, a smart card is used as a substitute to real tickets and which enables the users to store multiple ticket events. The main problem is that this biometrics suffers the same fate of being stolen and they cannot be change making identity theft more vulnerable. A password can be changed at anytime. Maintenance of issued cards is also another cost factor.

While matching physically known characteristics are well known as a way to proof ownership, there are instances where one can spoof the reader machine. Finger print readers uses a set of algorithms to identify pattern points on our prints but in test it has been shown that it can't distinguish between a real finger or one made out of a gummy mould. Other prior arts concentrated on authenticating the document itself in the belief that if the document is genuine then the holder with other identifications linked to the genuine document is sufficient to proof ownership by association. Therefore these prior arts teach incorporating security features but made no efforts to further prove ownership. Other prior arts teach comparing the physical known characteristics of the holder or owner such as biometrics to establish identity.

BRIEF SUMMARY OF PREFERRED EMBODIMENT THE INVENTION

This invention is expressly described to proving ownership. This invention first determines whether the representation is genuine by reconciling issued identifier data and secondly to verify the ownership of the document by requiring the holder to present a password to be reconciled against the password linked to the said stored unique identifier in the database. The inventor believes the best way to prove ownership of a representation is for the owner to provide the password linked to the representation for authentication as described in our earlier U.S. patent application Ser. No. 09/945,586 herein incorporate by reference.

This invention uses a random alpha-numeric-symbol-picture generator and does not hold any numbers on store prior to issuance. Alpha/numbers issued are first verified to be unique and random before being accepted as an identifier. Furthermore the usage of this generator is merely to link to the user's password and by itself it is but one part of the key without which the ownership cannot be authenticated.

To reduce the single point of vulnerability (besides encrypting the database), this invention also employs chaffing method, which is a simple way of hiding real transactional data amongst dummy or decoy data. This means for every one real transaction generated, this system creates another say 20 'similar' transactions and inserting them into the temporary account to mask or chaff the real one, making it difficult for the intruder to guess which is the real one.

Similarly fictitious transactions which are bogus but appears similar to the real thing to the naked eye. If the intruder uses the fictitious data and manages to present them, these data will reconcile to an non existence account and will instantly alert the system administrator. Non existence account here refers to an account, which in reality does not exist in the main issuer's accounting system and therefore cannot, qualified as an originating account. As an example, such accounts can be created by using a list of names from an old phone book by first mismatching the first and second names and combining with mismatched address and random dates of birth to create these bogus encrypted data. The key here is deterrence by making it difficult for the intruders.

This invention is also capable of storing decoy passwords and real passwords and bogus accounts. Decoys can be used to raise alarm and pass through a fake transaction with all the appearance of a real transaction.

Furthermore the economic cost is very much lower as compare to prior arts since it can be envisaged that the owner can make changes to their password or cancel online at no cost and in real time.

The use of paper is more affordable and if mutilated or destroyed can easily be replaced at minimum cost. The user need only to login and print it again. Moreover the next generation of printable plastic or composite paper or light emitting polymer material using compounds such as phenylenevinylene which may be used in substitute should reduce said problem as described by Goldstein. The latter uses electricity to display while the former uses printing action.

The preferred usage is for the issuance of password protected financial instruments such as credit notes backed by a credit line or debit notes backed by a deposit facility. The invention allows the user to incorporate a password on the instrument or representation and steps for printing the representation of economic value to purchase goods and services from a merchant or exchangeable for real cash upon verification. On issuance, the amount dedicated in the representation is transferred to a separate transaction-in-progress account or a floating account or temporary account or escrow or trust accounts depending on the legal requirements in different countries to await execution. Upon execution, which refers to presentation of the representation of economic value for verification, the amount is then transferred to the verifying entity, which can be a seller or merchant.

The issuer server is a programmable computer being networked to the Internet allowing the user to connect and do the usual selection of banking services remotely. The issuer server is typically a server being operated by a banking institution known as a bank portal. The said computer includes memory with programmable steps for receiving user's request for a number of services including ordering representation of economic value. Its transaction module consists of programming codes for the printing of the representation at user's printer after the requested value has been withdrawn from their bank accounts to a temporary account. It is noteworthy to recognise that instead of a credit or debit note, one can also print a cheque or demand draft or traveler cheques which have similar payment functions on presentation.

To date, users have often been limited in their usage of cheques or notes because there is no easy way to authenticate and transfer the funds on demand. In most cases, it takes 3-5 days to clear a cheque or bank draft making it a poor tool for instant payment. This invention includes steps to immediately debit the user's account for the amount authorised and stored this value in an escrow or temporary account until the instrument is presented for verification upon which it is transferred to the payee on acceptance by payee. An acknowledgement is then issued to both the payer and payee electronically. In one aspect this invention is useful as it provides an alternative to withdrawing real cash from an automated teller machine by transforming a user's personal computer coupled with a printing device to withdraw representations of economic value in substitute. In terms of security, this invention secures said representations with a password which can only be activated by the user or payer or payee, making it more secure than real money which can be used after being stolen. Each economic value representation is embodied as a bearer instrument hence it is printable at any local printer and comes with a pre-set expiry date. Once funds are withdrawn from the user's account, as a precaution, they cannot be transferred back to the user's account. Funds however can be suspended if a decoy password is presented or by manual instruction by the user. However if these funds are not verified or used after the pre-set expiry date, the funds will automatically return to the originating user's account by the accounting system.

Accordingly, it is an object of the present invention to provide an alternative electronic monetary distribution system, which utilises economic value representatives that are interchangeable with traditional cash and universally accepted at all point of sales over the Internet.

It is another object of the present invention to provide a method of securely transferring economic value including currency and credit among subscribers, among financial institutions, and between subscribers and financial institutions. Subscribers here include both users and merchant verifiers.

A further object of the present invention is to provide a multipurpose payment system whereby transactions can be carried out in both an on-line (withdrawing the funds to a temporary account by user and verification process to credit to an account designated by payee) and an off-line mode (physically presenting the representation for exchange with predetermined amount).

It is still a further object of the present invention to provide a user friendly electronic payment system that may be used reliably and securely for real time transfers of money between members of the general public, between members of the general public and commercial organizations and between commercial organizations.

It is still another object of the present invention to provide a system for withdrawing economic value amount by integrating with a wide variety of data processing and data communications systems including currently available banking portal services.

It is yet a further object of the present invention to provide a system for safely transferring economic value in transactions of virtually any size denomination.

It is yet another object of the present invention to provide an instrument of economic exchange that is fungible, easily transferable, undeniably redeemable, and secure from duplication, and counterfeiting.

The system includes a plurality of issuing banks comprising issuing servers; a random generator module for creating unique identifiers linked to representation of economic value or electronic representation in the server;

verifier modules for performing payment transactions, such transactions including the accepting, verifying and authenticating the presented password protected representation;

a security system for providing the overall integrity of the presented representation system;

an accounting system for clearing, settlement the presented representation accounts of different issuing banks and for clearing the economic value representations issued by the issuing banks with real money;

and a plurality of transaction modules for authorised users to transfer the money between their banking accounts to temporary accounts and withdrawing the money as a printable representation of economic value at their printers.

According to the preferred usage and embodiment of this invention, a method is provided for users wishing to obtain a representation of their real money which may be use as payment for goods at point of sale where these representations can be verified, comprising the following steps:

(a) the user gain access to their online bank accounts;

(b) the user indicates the amount for the representation;

(c) the user is asked for a password to be linked to the representation, a dummy or decoy password can also be entered if required;

(d) the amount previously indicated is withdrawn from user's account in real time to a separate account such as an escrow account to await execution;

(e) a chaffing method is used to hide the real transaction in the temporary account where bogus data are created;

(f) on confirmation of the withdrawal, a randomly unique alpha numeric identifier is created and linked to the user's password stored in the database together with user's details, (g) the user's printer is instructed to print a representation of the stored economic value with user's data and unique identifier;

(h) user may receive an electronic receipt at user's mobile device if required;

(i) user can cash the representation by making a purchase with a merchant herein also known as the verifier;

(j) at the merchant, the representation is first checked for validity by querying the issuing bank over a network;

(k) once this is accepted then user has to authenticate ownership by presenting a password linked to the representation at hand;

(l) reconciled with the originating account to ensure that this is not a bogus account; and (m) issuer bank finalising by automatically transferring the user's amount from temporary account to credit merchant's account for the same upon acceptance by verifier.

In contrast to prior arts such as in U.S. Pat. No. 5,598,477, there is no public key or private key to consider on the representation. The printed representation is forgery proof since it is linked to a password that only the owner knows. Previous prior art uses the printed receipt as proof of payment which can be copy similar to paper money with little regards to proving ownership. Even if the receipt carries the owner's name and address which is capable of being read by a machine, there is still the necessary need to counter match this with the holder's other physical identification papers, a task that is prone to human error or abuses. A password build into the presented instrument is the best and easiest way to automatically verify ownership. It is envisaged that password can be a voice print or other identifiable biometrics although at this time, this invention prefers using alpha-text password being keyed into the system through a linked alpha-numeric pad for the reasons given above. Other security features include a security image printed on the instrument which carries certain symbols readable by special machine reader or a photo of the user are incorporated for added security.

Other Embodiments of the Invention

According to other embodiments for this invention, a method is provided for users wishing to secure their existing valuable documents such as passports, comprising the following steps:

(a) registering their documents information with at least one password key with the document service provider over a network;

(b) on confirmation of the information received from the user; verification steps wherein steps include checking user's credit card validation by generating a random value say from 0 to $1 to be charge to user's credit card where this random value is required to authenticate credit card ownership. User is required to reply to service provider with this random value and if this value matches the value generated by service provider, credit card validation is complete;

(c) other type of verification may be included like debiting bank account by a random value and asking the user to response as to the value debiting. The critical factor here is to be able to verify an physical address linked to some kind of proven account such as a credit card, utility bill, bank account where material verification process has already been completed by others;

(d) another type of referral verification is linked to relationship where user is asked for identities of 3 persons not related to user to confirm user's identity;

(e) yet another type of verification involving professional circle where user is asked for university attended, professional, club etc;

(f) each verification has a score point from with the maximum accorded to all successful verification;

(g) in the mean time, the service provider may authorise the user to print a temporary label where it includes information identifiable to user such as name and address and at the same time create an unique randomly generated number combination alphabet in the form of a machine read able barcode together on this label;

(h) the user may print this label over the network however until all verification is done as steps above the user status remains as "unconfirmed";

(i) user may apply this label onto the valuable document where it is visible and accessible by either a human operator or machine;

(j) on confirming all the verifications user may be notified by service provider of this status and the database record is updated to status confirmed; and (k) the service provider may send by security mail an official label to the user at user's physical address.

According to another usage for this invention, a method is provided for users wishing to secure their new documents such as a new passport or birth certificate or driver license, comprising the following steps:

(a) the user registers at the service provider's system with the usual personal details and is requested to provide a password to be incorporated;

(b) users at this stage have to provide the usual documentation such as birth certificate, mother's birth certificate etc to provide identification;

(c) when the valuable document is being produced, a particular section is hard coded with information such as a randomly generated number in code readable by a machine;
(d) said randomly created number is also stored in service provider's system being linked to the user's password;
(e) to provide greater security, user is encourage to obtain new randomly generated number for the document at regular interval wherein method includes;
(f) logging into the service provider's system and requesting for anew label with a new random generated number;
(g) the usual verification may be included where address is determined, bank accounts are linked as per above;
(h) once confirmed, the label is generated and user can then affixed it over the previous hard coded randomly created number/alpha;
(i) service provider may provide an official copy of the label at a cost or the user may continue using the printed version; and
(j) the method encourages changing the identification link to the original document so that even if forgery is possible, the forger may not be able to guess the current random number used to link the document nor is the forger able to guess the user's password.

According to yet another usage of this invention, a method is provided for users wishing to obtain passes which provides access to various venues, comprising the following steps:
(a) the user connects to the service provider and request for a pass by indicating the nature of the visit;
(b) the user is requested for the usual personal details and a password;
(c) a pass is then created online with a randomly generated number in the form of a readable barcode;
(d) the service provider approves the visit and the pass is activated;
(e) the user is informed of the validation of the pass;
(f) on presentation on the date of visit, the pass's randomly generated number is verified against the service provider's system;
(g) if it is accepted, user is ask for the password; and
(h) and only when the password is verified against the pass can the user be allowed entry.

According to yet another usage of this invention, a method is provided for users wishing to create a physical cheque or financial instrument, comprising the following steps:
(a) the payer provides a means to debit either a credit card facility or bank account from which a cheque make payable is made;
(b) the payer is requested by service provider for the payee's information which can be as little as an email address;
(c) the payer will be asked to credit service provider with the amount payable to the payee;
(d) the service provider will then contact the payee and to ask payee to provide personal details and other verification methods as above is applied;
(e) for the drawing of a cheque, the payee is ask for a password to be linked to the cheque as well as for a drawing bank;
(f) the cheque is then printed with a randomly generated number linked to the payee's password;
(g) payee will be able to bring the cheque to the drawing bank for cash or credit into own account;
(h) at the drawing bank, the cheque is first checked for validating by querying service provider over a network;
(i) once this is accepted then user has to authenticate by presenting a password linked to the cheque at hand;
(j) drawing bank complete a manual transfer by crediting payee and debiting service provider's account for the amount paid; and
(k) service provider here can be a bank.

Some simplifications and omissions may be made in the above summary, which is intended to highlight and introduce some aspects of the present invention, but not to limit its scope. Detailed descriptions of the preferred embodiment adequate to allow those of ordinary skill in the art to make and use the inventive concepts will follow in later sections.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION OF THE PREFERRED EMBODIMENT

Figure 1:
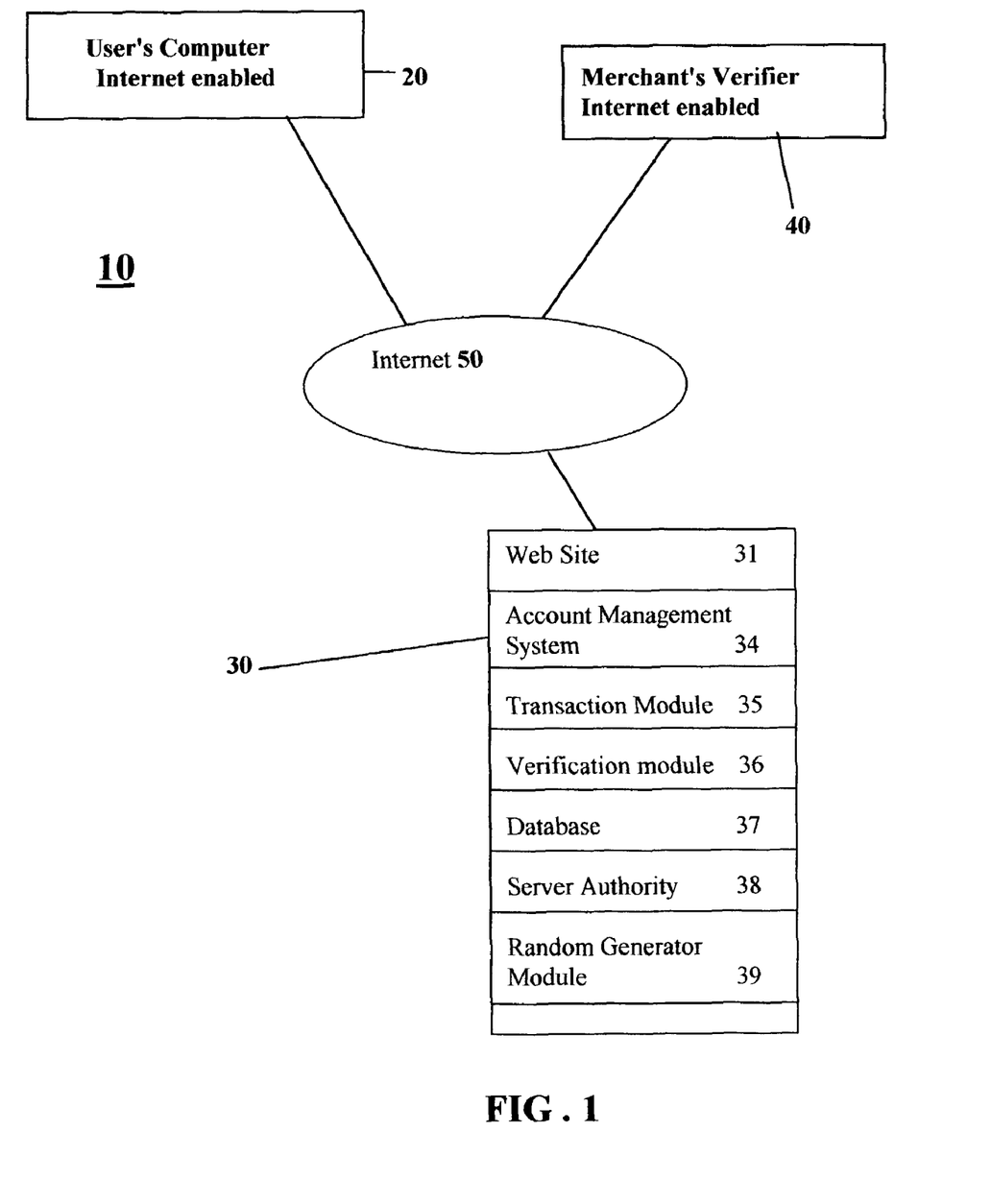
FIG. 1 is a simplified illustration of a computer network system in which the present invention may be implemented.

FIG. 1 is a block diagram of a computer network system 10 of the present invention. Computer system 10 comprises at least one client or user computer 20, preferably a computer workstation. Computer 20 is connected to an issuer server computer 30, at least one of merchant's verifier 40 over at least one computer network 50 commonly known as the Internet.

Computer 20 is a computer generally known in the field of computers. An issuer computer 30 contains hardware and software adapted to communicate with other computers over a computer network and to make available computer files or software stored in the server computer or a storage device connected thereto such that they can be accessed by a person from another computer connected to the network.

Although one issuer computer server is adequate for the purpose of this invention, to achieve the benefit of redundancy, data security and distributed computing, more than one computer server is preferred.

The computer system of the present invention operates as follows:

Computer 30 makes available a web page 31 which is a program written in either PHP3 or in Active Server Pages (ASP) to process scripts on the server, which is accessible by users' computer 20 and 40 through computer network 50. It is common for the web pages to be stored in a storage device to be executed by a server program such as Apache or Internet Information Server (IIS). The main entry point into the system uses internet protocol such as Hypertext Transfer Protocol (HTTP) which is a well known application protocol for users to access files. The user can initiated a network path to the server which is identified by its Uniform Resource Locator (URL). Once connected the user is asked to input his access authority such as a login and password. Once accepted by the system, the user can select the many services including withdrawal of funds in the form of a representation of money in the form of a credit note or bank cheque. It is preferred that the issuer here is a bank hence the system being accessed by the user is one of a bank portal which offers services such as payment transfer, bill presentment and so on. The user is asked to provide the amount for the facility and a separate password to activate the representation later. To enhance security, the user is asked whether to include a self-photo or for the system to use a security image by random selection. The self-photo has one advantage where the verifier can immediately identify the presenter.

However this is not fully secure since it is possible to graphically replace this picture by simple image-editor software. The main security should always be the unique identifier (as the first key) and the password (as the second key). Another security enhancement is the inclusion of a decoy password in the event that the user is threatened to reveal the enabling password, one such password can be used as substitute. Once this decoy password is used, it provides all the appearance of a real transaction. Users who openly abused this feature without good cause will be forced to pay a penalty or worst be charged under the crime of stealing if the transaction is taken against a legitimate transaction. An input box for email is required in order to sent a confirmation receipt although this step may be redundant since by default the user should already have an email address registered with the system at the outset. Preferably the connection between the user and the issuer server be encrypted which is common for this type of transaction. A digital receipt to the user's mobile device can also be provided as final proof of withdrawal where such digital receipt can be reconciled with the system on demand through a wireless means such as bluetooth.

FIG. 1 depicts a preferred embodiment of a computer system 10 for originating and issuing an economic value representation in the form of a bank note and printing it on-line of the present invention. Computer network system 10 comprises a general purpose programmed computer 30 as an issuer server connected to computer network 50. Preferably, programmed computer 30 is a computer server, and computer network 50 is the Internet. More preferably, server computer 30 is connected to the Internet 50 via the fastest available connections. Computer 40 is a merchant verifier terminal with an attached bar code reader connected to the Internet 50. Alternatively, the merchant can key in the unique identifier using a general keyboard or by employing a device capable to read machine codes. Computer 20 is a user terminal capable of connecting to computer 30 via network 50.

Server computer 30 includes: (1) a World Wide Web site 31 such as www.issuerbank.com hosted by a web server software such as Apache or IIS 5.0; (2) a computer software 34 called Account Management System (AMS) for managing the "back-end" of the system such as managing accounts updates, deletion, administrative, maintenance, reconciliation of accounts, reconciliation of temporary accounts and users' accounts, accounts roll-back facility; (3) Verification Module 36 a program that verify and activate notes and facilitate payment; (4) A General Database 37 for storing information such as account information and details of transactions; (5) Server Authority 38 a software to run administrative tasks such as verification and authenticating the users, administrators and merchants and report generation and audit trials which is used by the administrator of the system only; (6) Transaction Module 35 for user to withdraw funds from their accounts to create economic value representations; (7) A program to generate unique and independent alpha-numeric identifiers on demand known as a Random Generator Module 39. This program is also used to create bogus representations closely resembling the real transaction and to insert them into the temporary account. This can be done manually by the operator or automatically whenever a genuine transaction is being created.

They are described in more detail below. All programs are accessible via their respective clients and are managed at the server side A. The Web Site (31)

In the preferred embodiment, Web site 31 provides the following information or to applications:

(1) A summary of current facilities and their status;

(2) Description of the types of facilities available;

(3) Description of the organization, designated herein as www.issuerbank.com, that runs the system and list of benefits and costs for using the system;

(4) Description of required legal disclosure for using the system;

By design, executed scripts in either Active Server Pages populate processed data from the database to be displayed to the users upon request. These pages then request the users to take further actions on this information such as providing instructional links, inputting a selection, updates, add new and so on. Javascripts embedded in the web-pages also provides for client side checking of inputted data by users such as validating emails address, post codes and amount inputted, preferably using client side scripts. Web-pages cannot execute backend functions but only facilitates them using commands such as "search", "post" and "submit" for further action by Account Management System 34 since these data can only be processed at the backend. Web-pages are hosted by a web-server such as Apache or IIS 5 which facilitates the execution of the scripts or codes on the web pages.

B. Account Management System (AMS) 34

Account Management system (AMS) is a client/server application residing on server computer 30. It hosts a database such as Oracle or MS SQL 7. AMS 34 is designed to be all purposed and can be adapted for as many database administrative functions as possible. It stores the many passwords associated to the issued financial instruments or economic value representations, merchant's logins and accounting for each transaction. It manages the setting up of an escrow or temporary accounts or in-progress account where money withdrawn for the financial instrument but not activated are accounted for each instrument. It does reconciliation of accounts, roll-backs and audit trials. In terms of external functionality, it is linked to the transaction module 35, verification module 36 and random generator module 39.

C. Verification module (WM) 36

This program is required for the merchant verification or verifier side where it checks the presented representation first for expiry date and secondly to verify the representation for its legitimacy. If verified this is follow by a step to activate the representation. Once a representation is activated, a request for the password to authenticate the owner of the representation is executed. The password is then captured and matched with the one stored in the database through AMS 34. If the password is verified and the user's originating account is reconciled with the amount debited then AMS will transfer the amount stored in the temporary account or escrow account to the merchant's account or verifier's account upon acceptance by verifier.

D. Server Authority (SA) 38

Server Authority 38 functions as an "administrative" program where entries are considered and verified by the web site operator. Web site operator use this program to monitor activities and connections to the computer 20 and 40 and can manually disconnect users. Web site operator also manages the login accounts and provide authority to create or delete accounts. It also monitor the performance of the server and may start, suspend or stop each processes in the system.

E. Transaction Module (TM) 35

This program allows the user to make a withdrawal from their physical account, an exact amount in economic value terms to be represented by a printed representation. It works by authenticating the account's existence and balance with AMS 34 and allowing the user to indicate the amount to be withdrawn. Once the amount is confirmed, AMS will debit the user's account accordingly and credit a temporary account with the same amount. Transaction module 35 will request the user for a password to be linked. Upon crediting the amount to the temporary or escrow, Random Generator Module 39 will generate an unique random alpha-numeric code to be associated with the amount held in the temporary account which stores all the issued but not activated representations' codes. At the instance of creation, random generator module will independently verify that the created code is unique by doing a search in the temporary account or escrow account in the database. Said temporary account database holds all issued representations by all of the bank's users including bogus representations. Issued here refers to representations that are created but have not been presented for verification and hence not activated. Once the said unique code is assigned to the said amount, transaction module 35 will link the user's password to the amount in the temporary account's database. Transaction module concludes by asking the user to print the representation at user's printer, email or send a digital receipt by SMS to user. Transaction Module then terminates session with user.

F. Random Generator Module (RGM) 39

It has only two functions and that is to create an unique random and independent alpha-numeric code to be associated with the represented amount upon receiving a signal that a particular amount has been credited by AMS 34. The seed for such a generator should be from a physical device rather than the system internal clock. A series of modules should be used instead of one and they are made interchangeable from time to time. The secondary function is to create bogus representations to populate within the temporary account. These representations are create to confuse the intruders and cannot be reconciled with a real originating account where the funds were previously withdrawn from as they do not exist. Presentment of bogus representation will raise an alarm to Server Authority 38 at the time of verification.

G. Database 37

Database here functions to store data as they are posted or updated or deleted. AMS 34 host the database and remains the main controller in terms of managing data into and out from the database. Amount information, passwords, unique codes are stored and encrypted in the database. It is readily understood by those skilled in the art that the database need not be in the same server. In practice provisions are made to store sensitive information in an independent storage device remotely from the issuer server.

The computer programs as described above at the web site include appropriate display routines for generating a set of display screens that together comprise a user interface for the site. By going through these displays, one will be able to see the real functions of each program and their interactivities.

Figure 3:
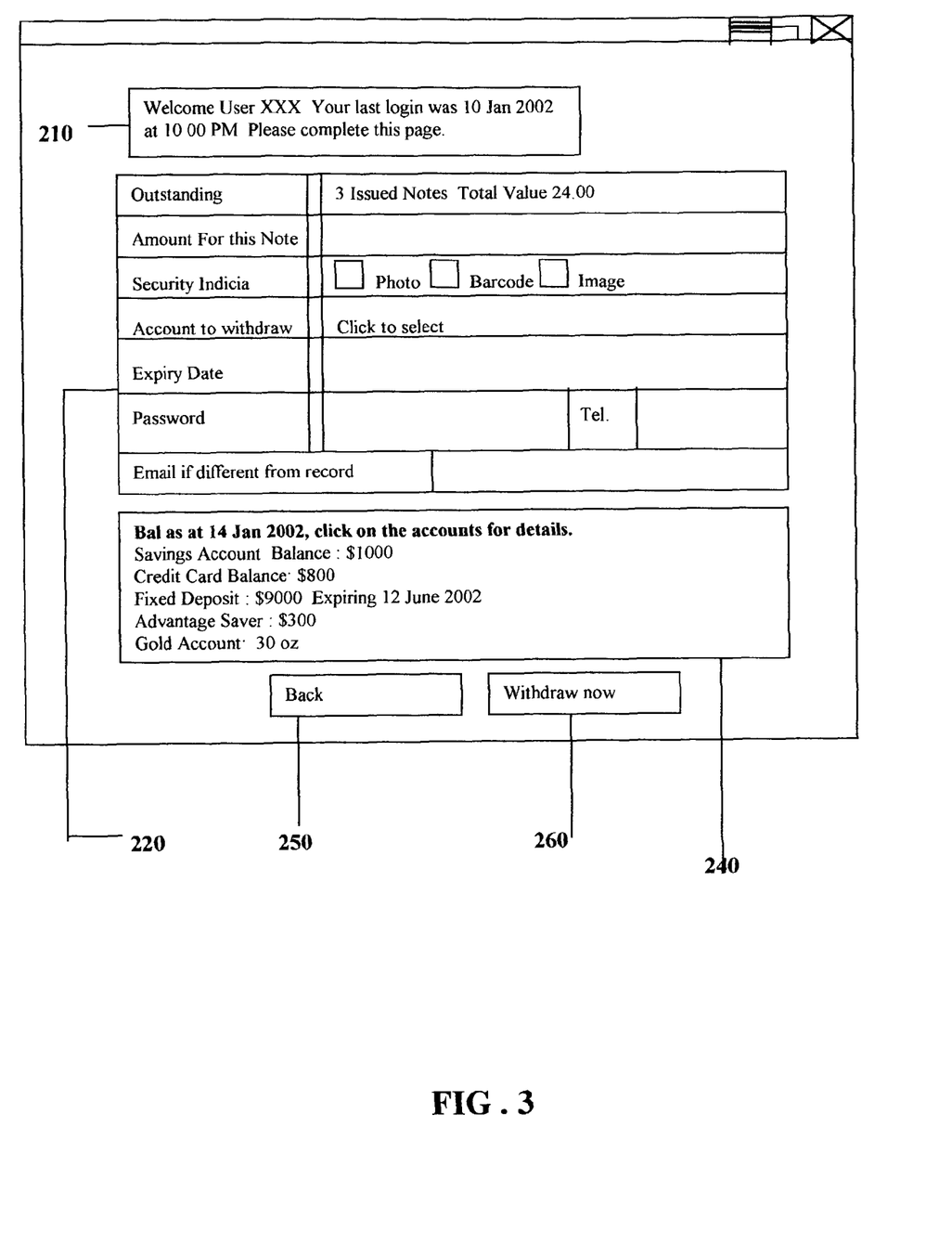
FIG. 3 is a representative user interface illustrated a web page for the user to input details to withdraw funds in order to create the representation.
Figure 6:
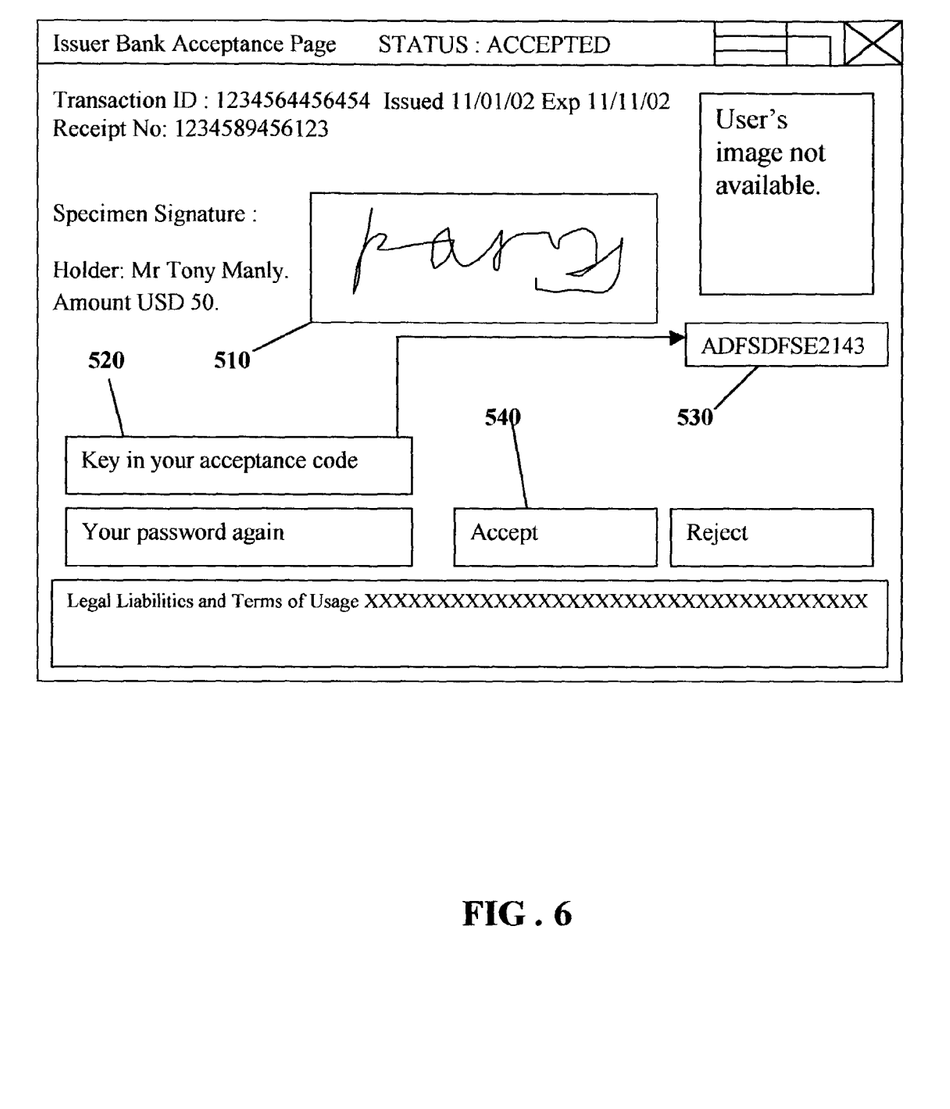
FIG. 6 is a verifier's approval web-page representation for the merchant to accept the representation in the form of a bank note.

FIGS. 3,6 are representative display screens, although the particular screen layouts should not be taken to limit the scope of the present invention.

Figure 2:
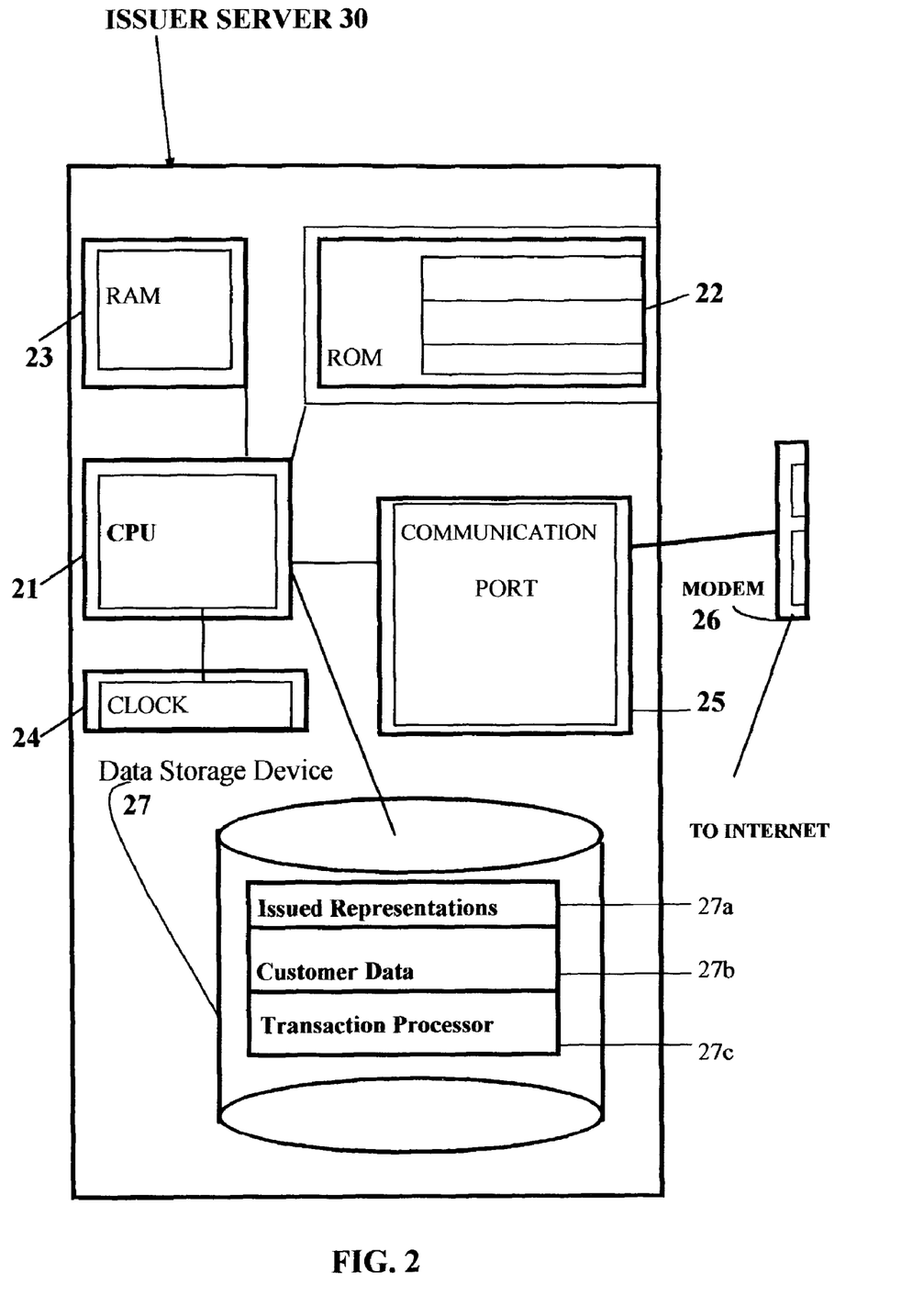
FIG. 2 is a block diagram for an issuing server in which the present invention may be implemented.

FIG. 2 is a block diagram of a preferred issuer server 30 which is a programmed computer. The issuer server includes a CPU 21 which performs the processing to functions. It also includes a read only memory 22 (ROM) and a random access memory 23 (RAM). The ROM 22 is used to store at least some of the program instructions that are executed by the CPU 21 such as portions of the operating system or BIOS and the RAM 23 is used for temporary storage of executable codes usually reserve for particular programs such as AMS 34, VM 36, Server Authority 38, Random Generator Module 39, Apache or IIS. A clock circuit 24 provides a clock signal. The use of a CPU 21 is in conjunction with ROM and RAM and a clock circuit. The issuer server 30 also includes a communication port 25 which enables the CPU 21 to communicate and query with devices external to the issuer server 30. In particular the communication port 25 facilitates communication between the modem 26 and the CPU 21, so that information arriving from the modem 26 can be processed by the CPU 21 and the CPU 21 can send information to remote location via the modem 26. Modem 26 is mainly use to connect to the Internet to reach the user's computer 20 and merchant's verifier 40. Alternatively, a token ring adapter may be use to enable communication over a network. The CPU 21 can also store information to and read information from, the data storage device 27. This data storage device 27 includes a temporary account holding issued representations database 27a and a corresponding customer database 27b, which are described below. In addition, it includes transaction processor instruction 27c which can be read by and executed by the CPU 21, thereby enabling the CPU 21 to process transactions. One of the preferred implementations of the invention is as sets of program instructions 31,34,35,36,37,38,39 resident in the random access memory 23 of one or more computer systems configured generally as described above. Until required by the computer system, the set of instructions may be stored in another computer readable memory, for example, in the storage device 27, or in a removable memory such as an optical disk for eventual use in the CD-ROM (not shown in the figure). Further, the set of instructions can be stored in the memory of another computer and transmitted over a local area network or a wide area network such as the Internet 50. One skilled in the art would appreciate that the physical storage of the sets of instructions physically changes the medium upon which it is stored electrically, magnetically, or chemically so that the medium carries computer readable information.

Although not described in this figure, it is well known in the art that such a device 30 would have connectors to a keyboard via a keyboard controller, mouse via a mouse controller, graphic display via a video controller which are controlled by the CPU 21.

While it is convenient to describe the invention in terms of instructions, symbols, characters, or the like, the reader should remember that all of these and similar terms should be associated with the appropriate physical elements.

FIG. 3 shows the web input page for the user wanting to withdraw funds from his account to issue a bank note. The user will arrive at this page after gaining access to his account stored in issuer server from computer 20. It is readily understood that if the user has a separate account by another issuer, said issuer server 30 may initiate a connection to the user's account resident in the other issuer server. Such instances would require the usual authentication between both servers to establish a secure connection first.

Box 210 shows the details of the user and last login time. In box 220 under Outstanding, this shows the amount outstanding for notes issued but not activated or used or spend. In this example, 3 notes are issued with a total value of 24 dollars. The next field Amount For this Note is required for the current amount. The following field Security Indicia shows the printed indicia on the note on issued which can be the user-self photo or an random image and a bar code. By default bar code and image are always checked. The field Select Account refers to which account the user wish to withdraw funds from. This is a pull down menu selection. Expiry Date field is for setting an expiry date for the to note. By default it should be no more than 1 month. If the note is not activated by the end of the expiry period then the amount allocated will be cancelled and return to the original account. The field Password is for the user to input a password to be linked to the note to authenticate ownership. In box 240, the user is provided with the balance details of his accounts which includes an embedded hyperlink to enable the user to see details of past transactions upon clicking. Button 250 representing "back" refers to back to the previous page, which is the main page and button 260 represents an execution of the present withdrawal and creation of the note. It is noted that java scripts should be use in the web-page to do client side checking such as the amount field should be less than the balance for the account chosen. Java scripts can be use to ensure all fields are properly filled.

Figure 4:
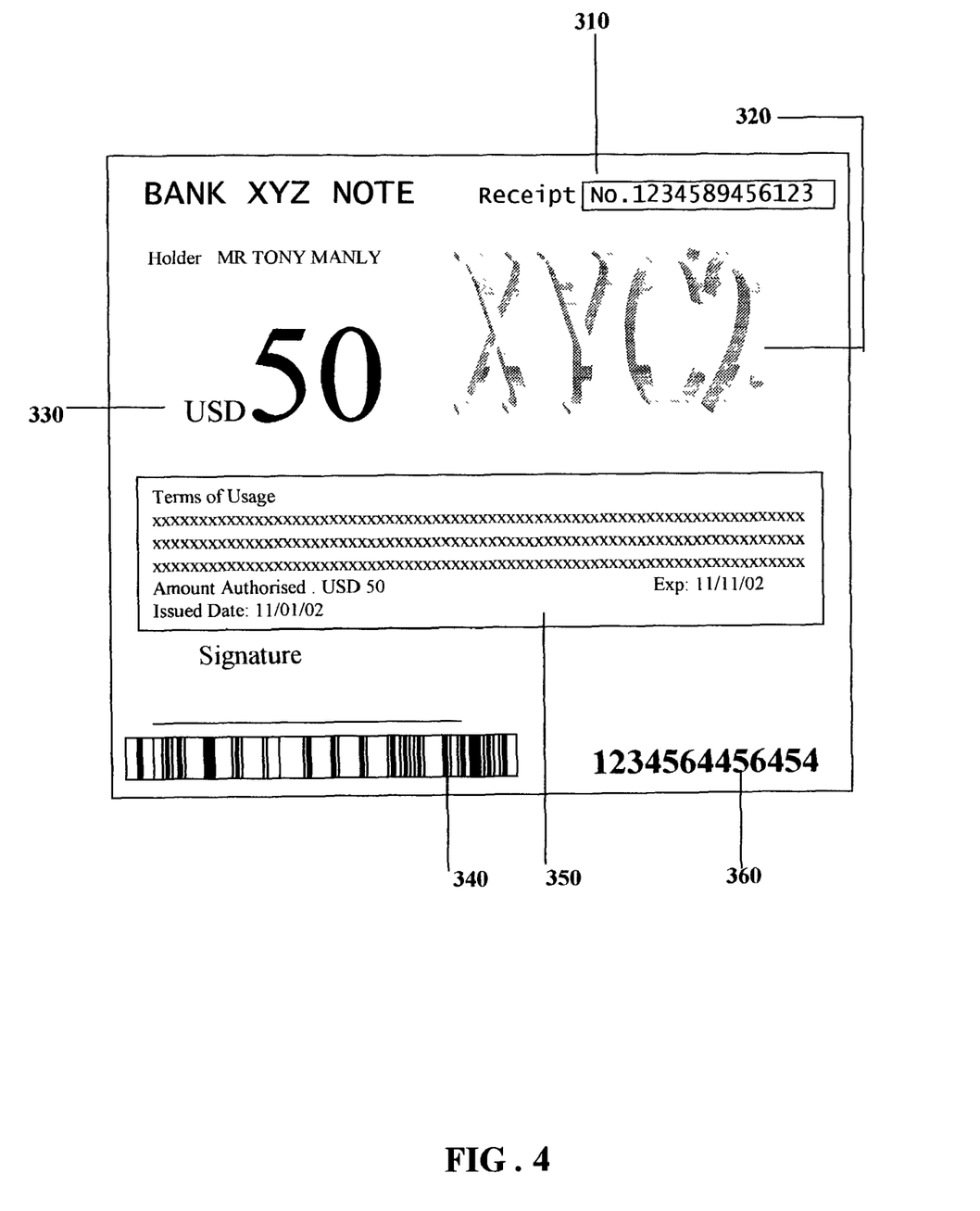
FIG. 4 is a representative of the printed representation as a bank note.

FIG. 4 is a simplified output page of the economic value representation in the form of bearer bank note for user after submission using button 260 in FIG. 3. The output of this page which is printable at user's printer has the following features. 310 shows the receipt number which identified this transaction. 330 shows the amount of this economic value representation which is USD 50. It is envisaged that the user may withdraw in his preferred currency else by default is the same currency as his account holdings. In case of non currency values like gold, the amount will be recorded as the weight of such metal or appropriate measurement units. 320 shows the random indicia image created by the system which is XYC2. The user may use his own self-photo instead of a random generator image or the bank's logo where appropriate. 340 shows the bar code of a random generated alpha-numeric identifier which is machine readable. This is a one dimension bar code but a 2 dimension bar code may be use in substitute. 2 dimension bar code can store more data. In 360, it shows the human readable random generated alpha-numeric which the merchant can input into the system for verification using a normal keyboard. The note may be configured without the human readable identifier. In 350, we provide features detailing the terms of usage and further details about the note. It is preferred that the user agree to the terms of usage and endorsed it by his signature to avoid disputes. Upon verification, it is preferred that a copy image of the user's signature and receipt number 310 are display at verifier's display device such as a monitor. At the completion of the presentation, the merchant will collect this note as evidence of presentation. The user will be provided the usual receipt of purchase.

Figure 5:
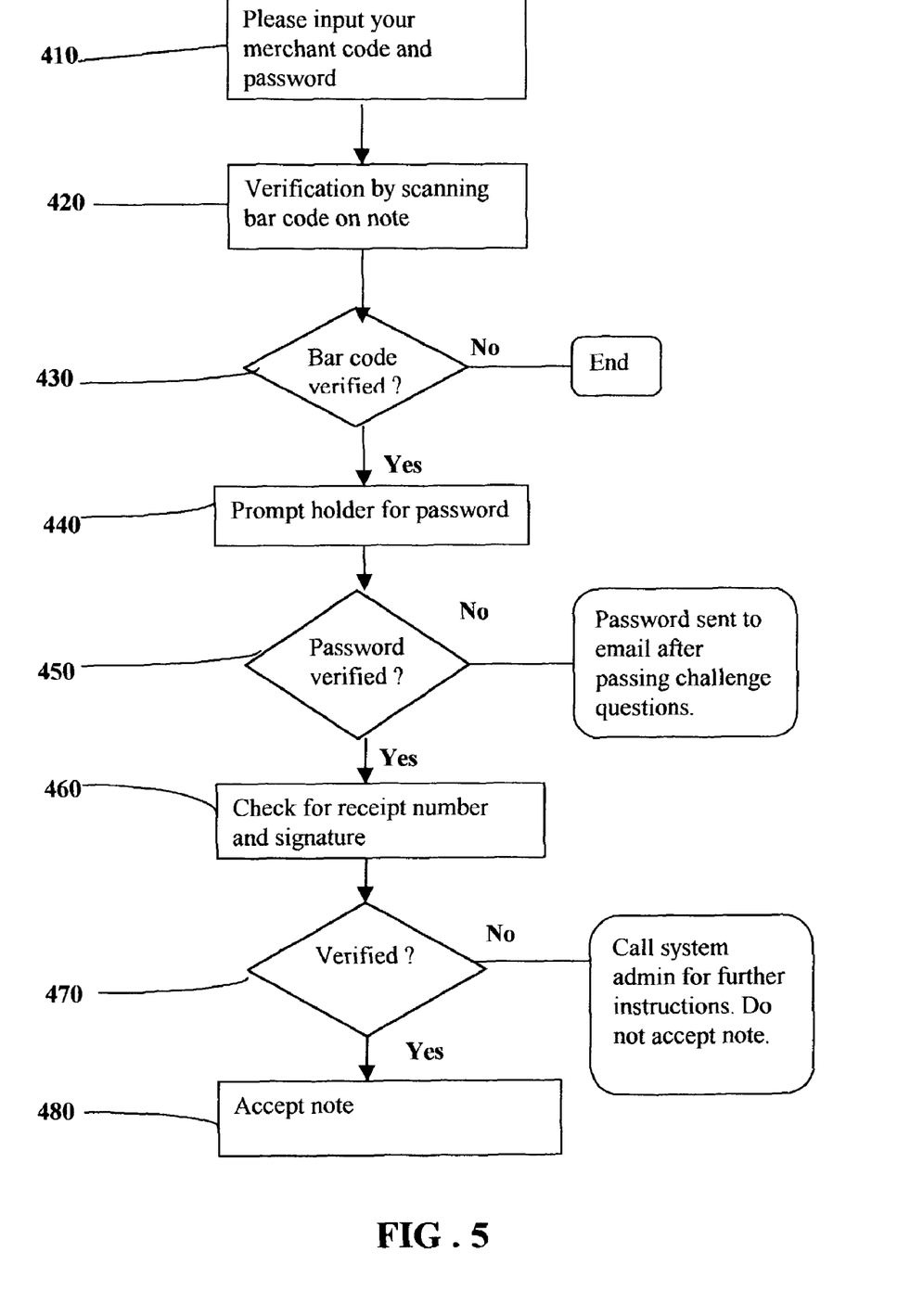
FIG. 5 is a flow chart representation of the steps taken to verify and authenticate a representation in the form of a credit note to pay for the goods or services.

In FIG. 5, this is a flow chart showing the verification events under VM 36 for merchant on acceptance of note. In Step 410, merchant is to login to issuerbank.com's merchant verification section. In Step 420, merchant login is accepted and the acceptance web-page provides for merchant to verify representation by scanning with a bar code reader or similar readable device into an input field. The captured barcode decoded into alpha-numeric is checked against issued notes data which is stored in a database remotely at issuer server. If the bar code is verified as in Step 430, then the holder is prompted for a password linked to the note 440. If the password presented is in error, the holder is asked a series of challenge questions and upon confirmation, the password will be sent to the user's default email address 450. In addition (not shown in FIG. 5) once a password is matched, AMS will reconcile the representation data to the originating account to ensure it is not a bogus representation. In FIG. 5, at step 460 the merchant can further confirm the legitimacy of the transaction by verifying the receipt number and user's signature by comparing the output as in FIG. 6. Receipt number is provided at the end of every transaction. The receipt number is transmitted at the point where the password is accepted and should be the same as printed on the note as depicted in 310. In addition a copy of user's signature image is transmitted to check against the representation as in FIG. 6. This image is often prepared by the bank at the time of user's opening a bank account and hence may be stored in the bank's main accounting system rather than in issuer server. In step 480 at to the point of acceptance of the note, the merchant is requested to accept note or cancel transaction. It is envisaged in circumstances where matching of signature is critical to include a writing analyser to capture the user's signature and electronically compare with the stored signature else a scanner may be employed which captures the signature with appropriate software to make point-to-point analysis to reduce human errors. It should be note that in FIG. 5, we have assumed that the expiry date on the note is valid and hence proceeded to verify the bar codes imprints. In practise, the human verifier should manually check and reject an expired note. However, one can appreciate that in case there is an over sight, the system will first check for the expiry field on presentation. Once merchant or verifier has confirmed all details, ie receipt number and signature, said merchant can input or click acceptance button or a series of code to indicate acceptance. At this point, the merchant or verifier is legally obliged to accept the note in exchange for real cash while AMS 34 will automatically credit the merchant account with the amount in authorised in the note. In completing the transaction, AMS will then deactivate the note in the system or update it as spend and record this transaction with both the user's and merchant's accounts as a book entry. Web operator may from time to time delete this representation's entry in the temporary account completely. Once a verified representation is deactivated or spend, the system will deny the same representation again being presented again.

In FIG. 6, this shows the preferred embodiment of an output-verified web page. In particular it shows the specimen signature of the user at 510 and the acceptance code at 530 which must be inputted into box 520 if the verifier wish to accept this representation by clicking button 540. Acceptance code 530 is randomly generated. The acceptance page may carry an image of the user where appropriate and will include as much details as possible such as the Issued date and expiry date, holder's name and amount even though they are repetitive.

Overall, the inventive mechanism is preferably implemented within at least one server over one network. Thus, the invention does not require any modifications to conventional client machine hardware or software. Although not meant to be limiting, the above-described functions are preferably implemented as standalone native code or, alternatively, such as a Java servlet. Generalizing, the above-described functionality is implemented in software executable in a processor, namely, as a set of instructions (program code) in a code module resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network.

In addition, although the various methods described are conveniently implemented in issuer server computer selectively activated or reconfigured by software, one of ordinary skill in the art would also recognize that such methods may be carried out in hardware, in firmware, or in more specialized apparatus constructed to perform the required method steps.

Further, as used herein, a Web "client" or "user" or "merchant verifier" should be broadly construed to mean any computer or component thereof directly or indirectly connected or connectable in any known or later-developed manner to a computer network. The term Web "issuer server" should also be broadly construed to mean a computer, computer platform, an adjunct to a computer or platform, or any component thereof capable of being a server in the ordinary meaning of the technical reference.

Having thus described our invention, what we claim as new and desire to secure by Letters Patent is set forth in the following claims.

While the present invention has been described above in terms of specific embodiments, it is to be understood that the invention is not limited to the disclosed embodiments. On the contrary, the present invention is intended for various modifications and equivalent structures included within the spirit and scope of the appended claims.

I, the inventor claims:

1. A computer network method for issuing and verifying a password protected representation of economic value exchangeable for money using at least a programmed computer to avoid acceptance of a fraudulent economic representation at the point and time of transaction between a merchant and a payee or bearer, comprising the steps of:
   receiving for verification a self-printed representation of economic value having machine readable codes comprising at least data identifying an unique identification linked to a password by payee or bearer;
   reading said machine readable codes to derive said linked password;
   requesting from payee or bearer a password to verify ownership of said representation;
   verifying ownership by comparing said password presented by said payee or bearer with said password linked to said unique identifier;
   responding to said merchant with said verification result;
   determining by said merchant whether to accept or refuse said representation at the point and time of transaction based on said ownership verification step;
   whereby said merchant accepts then exchanging predetermined amount of money in currency notes with said representation or crediting said predetermined amount of money to an account designated by said payee or bearer; and
   whereupon acceptance, said representation is expired.

2. The method according to claim 1 further includes steps to issue said representation comprising:
   asking payee or bearer for a password to protect said representation;
   generating an unique identifier;
   creating ownership rights by causing said password to be linked to said identifier;
   generating said representation having at least verifiable ownership rights;
   storing said representation in a database; and
   transmitting to printing device controlled by payee or bearer and printing said representation having readable codes comprising at least data identifying said unique identification linked to said password.

3. The method according to claim 2 includes steps to transmit said representation to a mobile device and storing as machine-readable codes on a computer readable media and whereby said device is used independently to said printed representation.

4. The method according to claim 1 wherein said representation of economic value is at least one from the following: gold notes, silver notes, treasury notes, bond notes, fixed rate notes, floating rate notes, certificate of deposits, equity notes, credit notes, debit notes, bank & personal cheques, bank bills, bank notes, traveler cheques and demand drafts.

5. The method in accordance to claim 2 further includes the step of requesting for a decoy password to pass through a fake transaction with all the appearance of a real transaction and to raise alarm.

6. The method according to claim 1, further includes a step for receiving for verification representations issued by different issuers; and
   whereby said programmed computer is a bank portal connected to at least one issuer's server.

7. The method according to claim 2, further comprising:
   requesting the payer for a bank account to debit the economic value amount to be claimed by said representation.

8. Computer executable software code stored on a computer readable medium implementing the method of claim 1.

9. Computer executable software code stored on a computer readable medium implementing the method of claim 2.

10. Computer executable software code stored on a computer readable medium implementing the method of claim 3.

11. Computer executable software code stored on a computer readable medium implementing the method of claims 5.

12. A computer network system for issuing and verifying a password protected representation of economic value exchangeable for money to avoid acceptance of a fraudulent economic representation at the point and time of transaction between a merchant and a payee or bearer comprising:
   one or more password protected self-printed representation of economic value exchangeable for money wherein said representation having readable codes comprising at least data identifying an unique identification linked to a password for ownership verification;
   a programmed computer, further comprising:
   one or more database for storing said representations;
   a memory having at least one region for storing executable program code; and
   a processor for executing the program code stored in the memory, wherein the program code, further comprising:
   code to request payee or bearer to present said representation for verification;
   code to read said machine readable codes to derive said linked password;
   code to request manual input of said readable codes to derive said linked password;
   code to request a password from said payee or bearer to verify ownership of said representation;
   code to verify ownership by comparing said password presented by said payee or bearer with said password linked to said unique identifier;
   code to respond to said merchant with said verification;
   code to provide said merchant to accept or refuse said representation at the point and time of transaction based on said ownership verification;

whereby said merchant accepts then, exchanging predetermined amount of money in currency notes with said representation or crediting said predetermined amount of money to an account designated by said payee or bearer; and whereupon acceptance, said representation is expired.

13. The system according to claim 12 wherein program codes further comprising:
 code for asking payee or bearer for a password to protect said representation;
 code for generating an unique identifier;
 code for creating ownership rights by causing said password to be linked to said identifier;
 code for generating said representation having at least verifiable ownership rights;
 code for storing said representation in a database; and
 code for transmitting to printing device controlled by payee or bearer and printing said representation having readable codes comprising at least data identifying said unique identification linked to said password.

14. The system according to claim 13 wherein program codes further comprising codes to transmit said representation to a mobile device and storing as machine-readable codes on a computer readable media and whereby said device is used independently to said printed representation.

15. The system according to claim 12 wherein said representation of economic value is at least one from the following: gold notes, silver notes, treasury notes, bond notes, fixed rate notes, floating rate notes, certificate of deposits, equity notes, credit notes, debit notes, bank & personal cheques, bank bills, bank notes, traveler cheques and demand drafts.

16. The system according to claim 13 wherein program codes further comprising:
 codes for requesting a decoy password to pass through a fake transaction with all the appearance of a real transaction and to raise alarm.

17. The system according to claim 12 wherein program codes further includes codes for receiving representations from different issuers for verification and whereby said programmed computer is a banking portal connected to at least one issuer's server.

18. The system according to claim 13 wherein program codes further comprising:
 codes for requesting the payer for a bank account to debit the economic value amount to be claimed by said representation.

19. Computer executable software code stored on a computer readable medium implementing the method of claim 6.

* * * * *